US010666312B2

(12) United States Patent
Khawand et al.

(10) Patent No.: US 10,666,312 B2
(45) Date of Patent: May 26, 2020

(54) SHARING ANTENNA ACROSS WIRELESS ENDPOINTS

(71) Applicant: Microsoft Technology Licensing, LLC, Redmond, WA (US)

(72) Inventors: Charbel Khawand, Sammamish, WA (US); Sean Russell Mercer, Issaquah, WA (US); Paul Klies, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/394,689

(22) Filed: Apr. 25, 2019

(65) Prior Publication Data
US 2019/0334571 A1 Oct. 31, 2019

Related U.S. Application Data

(60) Provisional application No. 62/662,696, filed on Apr. 25, 2018.

(51) Int. Cl.
H04B 1/401 (2015.01)
H04B 1/18 (2006.01)
H04W 88/06 (2009.01)
H04W 72/10 (2009.01)
H04L 1/16 (2006.01)
(Continued)

(52) U.S. Cl.
CPC .............. H04B 1/401 (2013.01); H04B 1/18 (2013.01); H04B 7/0608 (2013.01); H04L 1/1607 (2013.01); H04L 5/0055 (2013.01); H04W 72/10 (2013.01); H04W 88/06 (2013.01)

(58) Field of Classification Search
CPC ........ H04B 1/18; H04B 1/401; H04B 7/0608; H04W 88/06; H04W 72/10; H04W 16/10; H04W 88/08; H04L 1/0003; H04L 1/1607; H04L 5/0055
See application file for complete search history.

(56) References Cited

U.S. PATENT DOCUMENTS 9,679,454 B2 6/2017 Mishra et al.
2006/0030265 A1* 2/2006 Desai ................ H04W 72/1215
455/41.2
(Continued)

OTHER PUBLICATIONS

"International Search Report and Written Opinion Issued in PCT Application No. PCT/US19/029187", dated Sep. 6, 2019, 11 Pages.

Primary Examiner — Khanh C Tran
(74) Attorney, Agent, or Firm — Holzer Patel Drennan

(57) ABSTRACT

The technology disclosed herein includes an apparatus including an antenna, a number of endpoints using the antenna, and a co-existence manager configured to share the antenna among the plurality of endpoints by sending a resource request to one or more of the plurality of endpoints with at least one of a time for antenna resource use and a priority level for the antenna resource use request. Once the co-existence manager has received acknowledgement from the endpoints controlling use of the antenna resource, programming a scheduler with one or more scheduled events controlling access to the antenna by the plurality of wireless endpoints, wherein the scheduled events control one or more switches to connect the plurality of wireless endpoints to the antenna.

20 Claims, 8 Drawing Sheets

(51) Int. Cl.
*H04L 5/00* (2006.01)
*H04B 7/06* (2006.01)

(56) References Cited

U.S. PATENT DOCUMENTS

| | | | |
|---|---|---|---|
| 2009/0137206 A1* | 5/2009 | Sherman | H04W 16/14 |
| | | | 455/41.2 |
| 2009/0257379 A1* | 10/2009 | Robinson | H04W 16/14 |
| | | | 370/329 |
| 2011/0205984 A1 | 8/2011 | Lee et al. | |
| 2012/0020348 A1 | 1/2012 | Haverinen et al. | |
| 2012/0046000 A1* | 2/2012 | Gao | H04W 72/02 |
| | | | 455/73 |
| 2015/0200692 A1* | 7/2015 | Chiou | H04L 5/1469 |
| | | | 370/297 |
| 2017/0033829 A1 | 2/2017 | Homchaudhuri et al. | |
| 2019/0289514 A1* | 9/2019 | Ronen | H01Q 3/08 |

* cited by examiner

SHARING ANTENNA ACROSS WIRELESS ENDPOINTS

CROSS-REFERENCE TO RELATED APPLICATIONS

This application is a non-provisional application of and claims benefit of U.S. Provisional Application Ser. No. 62/662,696 entitled "Sharing Antenna Across Wireless Endpoints" and filed on Apr. 25, 2018, which is incorporated herein by reference in its entirety.

BACKGROUND

Telecommunication functionalities provided by devices, including mobile devices, is ever increasing. For example, mobile devices such as telephones were initially configured to simply operate as a telephone. Functionality was then added to include processors capable of executing applications on the device itself, maintain calendars, provide a variety of different messaging techniques (e.g., email, SMS, MMS, instant messaging), and so on. Consequently, mobile devices may be configured to support a variety of different communication techniques over different frequency ranges, such as a telephone network to engage in a wide area network wireless connection as well as local area network wireless connection. Traditional techniques that were utilized to support this wireless communication, however, relied on separate antennas that were specifically tuned to support a particular technique.

SUMMARY

The technology disclosed herein includes an apparatus including an antenna, a number of endpoints using the antenna, and a co-existence manager configured to share the antenna among the plurality of endpoints by sending a resource request to one or more of the plurality of endpoints with at least one of a time for antenna resource use and a priority level for the antenna resource use request. Once the co-existence manager has received acknowledgement from the endpoints controlling use of the antenna resource, programming a scheduler with one or more scheduled events controlling access to the antenna by the plurality of wireless endpoints, wherein the scheduled events control one or more switches to connect the plurality of wireless endpoints to the antenna.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Technology disclosed herein provides a system for sharing antenna across multiple wireless endpoints. For example, such system may be implemented in a mobile device such as a mobile phone, a tablet device a laptop, in a computing device such as a desktop computer, or in other devices carrying Internet of things (IoT) technology. The wireless endpoints may be various wireless endpoints that may use an antenna resource such as a cellular modem, a Bluetooth endpoint, a WiFi endpoint, etc. The system for sharing antenna across multiple wireless endpoints may include an application processor with a co-ex manager (referred to as the "co-ex manager") that works as an arbitrator of the antenna resource. Thus, the co-ex manager may control a switch that connects or disconnects an endpoint to an antenna resource. The co-ex manager can force a decision to connect an endpoint from an antenna resource or it can give a time-out period to an endpoint after which it forces that endpoint to disconnect from the antenna resource. Furthermore, the system for sharing antenna across multiple wireless endpoints may also include a scheduler that communicates with the co-ex manager to initiate change in resource ownership between the endpoints. In some embodiments, the scheduler is a component of the co-ex manager while in other embodiments, the scheduler is separate and distinct from the co-ex manager.

Figure 1:
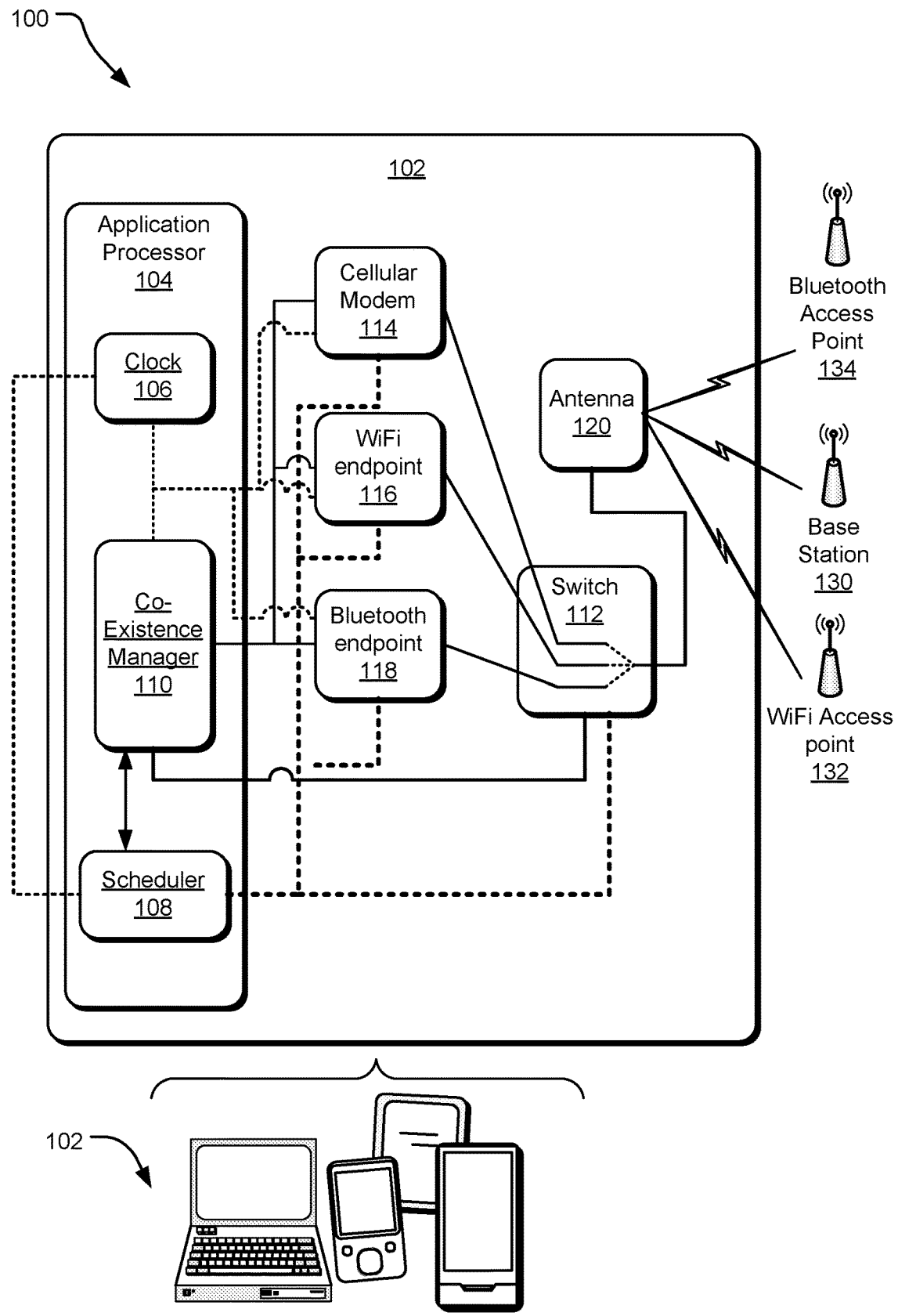
FIG. 1 is an illustration of an example block diagram of a system for sharing an antenna across multiple endpoints according to implementations disclosed herein.

FIG. 1 is an illustration of an example block diagram of an antenna sharing system 100 for sharing an antenna across multiple endpoints according to implementations disclosed herein. A co-ex manager 110 may deploy a hardware or a software scheduler 108 to fulfill the real time needs of antenna sharing and fast switching across all underlying technologies. In one implementation, the scheduler 108 runs off a real time clock 106 with a granularity that is decided by the co-ex manager 110. The co-ex manager 110 may chose the clock-based unit of time that satisfies the timing needs of all wireless subsystems or endpoints as it relates to sharing an antenna 120 or other events.

The scheduler 108 may be programmed with one or more events and it may run its scheduled events based off a clock such as a clock 106. The clock frequency of the clock 106 may be changed by the co-ex manager 110 depending on the current mode of the device 102. Once the clock frequency is determined at the clock 106, the co-ex manager 110 may communicate such clock frequency to all components and system of sharing antenna resource and a time base that all components and system of sharing antenna resource can reference for upcoming requests from the co-ex manager 110. Each subsystem, such as the cellular modem 114, the WiFi endpoint 116, the Bluetooth endpoint 118, etc., can sync its own clock with the clock 106 so that it references off the same clock base as the co-ex manager 110 and the scheduler 108. In one Implementation, the co-ex manager 110 can provide a proper mechanism for synchronizing its clock 106 with the rest of the subsystems. The co-ex manager 110 can also periodically update its clock 106 and re-synchronize the rest of the subsystems. The scheduler 108 can work off of a unit of time or use the concept of over the air frame boundaries that the co-ex manager 110 defines for all subsystems to reference for requesting their antenna resources. For example, in one implementation, the co-ex manager 110 generates a virtual frame that the WiFi endpoint 116 can use to fill in the events for the WiFi endpoint 116. While such virtual frame may not match the over the air frame boundaries of the WiFi endpoint 116, it may be substantially close so as to be able to fill in the antenna use events for the WiFi endpoint 116. The co-ex manager 110 may create such virtual frames for other subsystems as well.

The scheduler 108 may be programmed by the co-ex manager 110 for a schedule of upcoming antenna sharing events that are generated based on requests the co-ex manager 110 has received from the different subsystems ahead of time. As an example, the WiFi subsystem, including the WiFi endpoint 116, can send a request for sharing antenna 120 in 20 clock ticks relative to the start of the next scheduler frame. The scheduler 108 also allows antenna sharing control to be dispatched to various antenna switches, such as the antenna switch 112, when a scheduler event occurs. The pre-programmed actions of the scheduler 108 may not be limited to antenna switching but can also include other general purpose input/output (GPIO) functions that can be used to send indications to the wireless endpoints 114, 116, 118. In one embodiment, the pre-programmed actions of the scheduler 108 may include a bus transaction to a particular wireless endpoint or to all wireless endpoints.

In one implementation, the co-ex manager 110 can, however, without receiving specific resource requests from any subsystems (endpoints 114, 116, 118), override the use of antenna resources and manage them accordingly. In one example, the co-ex manager 110 can decide on its own a portion of time for which it assigns an antenna resource to the Wi-Fi endpoint 116 vs the Bluetooth endpoint 118. The co-ex manager 110 can also act as an arbitrator in cases where two or more subsystems have simultaneous antenna resource requests and same priorities. In such cases, the co-ex manager 110 can alert the subsystems ahead of time of its intent. Alternatively, such alerts can be generated directly by the scheduler 108 in real time.

Figure 7:
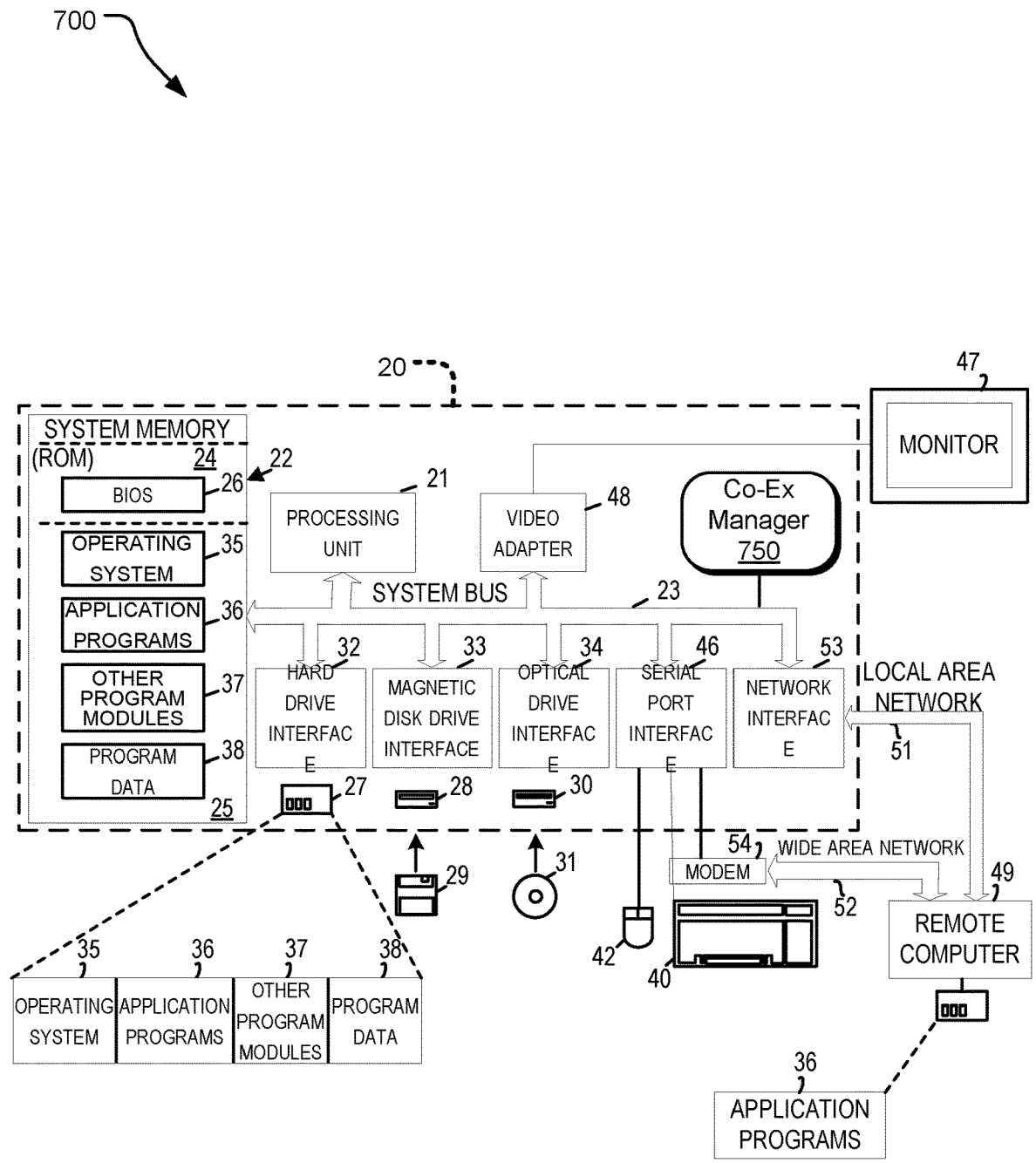
FIG. 7 illustrates an example system that may be useful in implementing the described technology.
Figure 8:
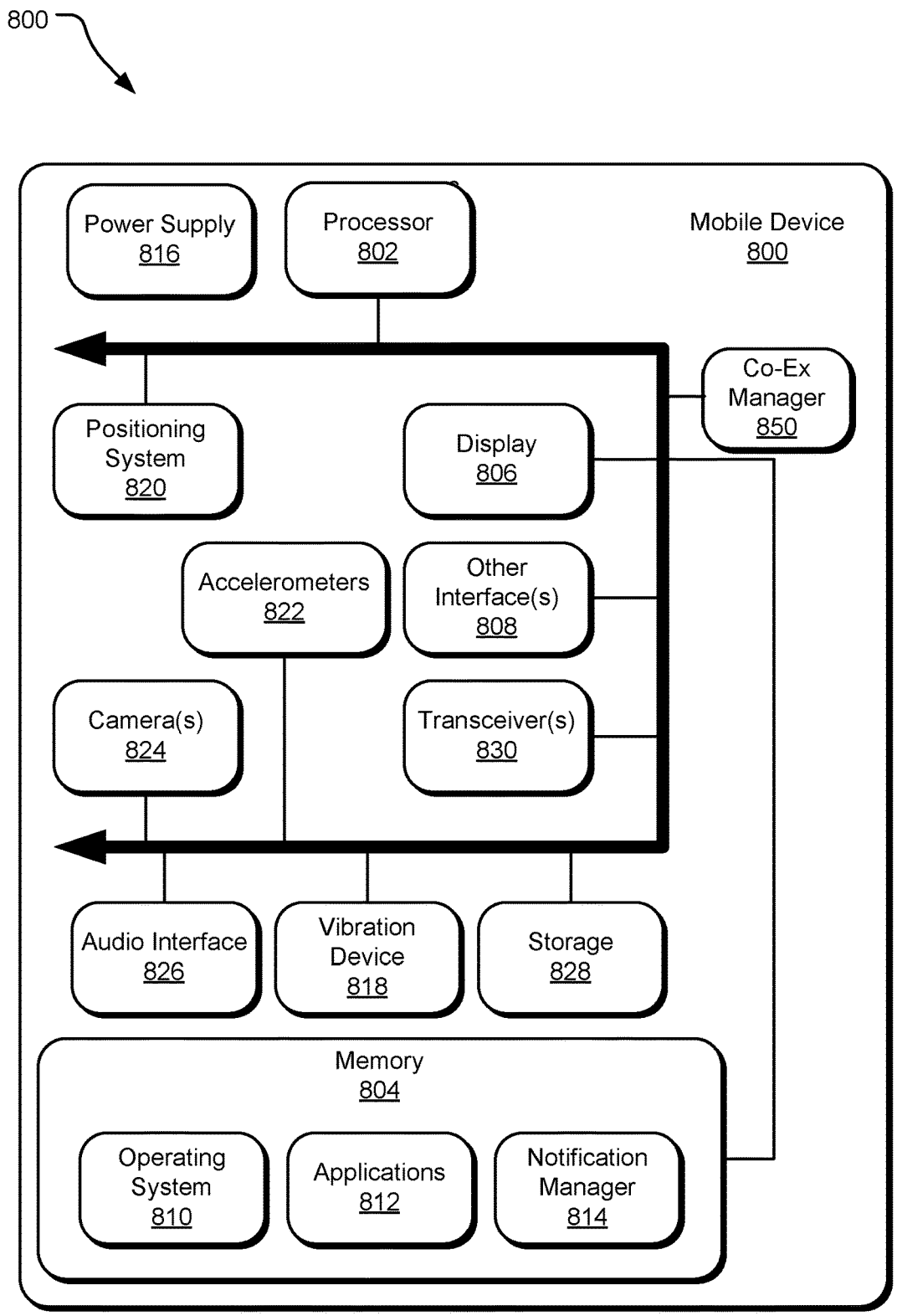
FIG. 8 illustrates an example mobile device that may be useful in implementing the described technology.

The antenna sharing system 100 may be implemented on a computing device 102, such as a laptop, a desktop, a PDA, etc. The device 102 may include, among other components as shown in FIGS. 7 and 8, an application processor 104 that includes the co-ex manager 110, the clock 106, and the scheduler 108. The clock 106 may be used to generate and provide a clocking signal to each of the co-ex manager 110 and various endpoints. In turn the co-ex manager 110 may use the clock signal to manage the time slots during which the various endpoints are given access to the antenna resource 120 and program the scheduler 108 with such information.

The co-ex manager 110 may communicate with various endpoints 114, 116, 118 that use the antenna resource 120. For example, the endpoints 114, 116, 118 may include a cellular modem 114, a WiFi endpoint 116, a Bluetooth endpoint 118, etc. The antenna 120 may communicate wirelessly with one of a base station 130, a WiFi access point 132, a Bluetooth access point 134, or any other external wireless communication system, such as a satellite, etc.

The scheduler 108 may be implemented as a series of instructions stored in a memory. In one implementation, the instructions may mirror computer programming syntax or can be specific to a particular hardware. For example, instructions such as those used in a typical language such as 'C' can be executed by the scheduler 108 or special new hardware instructions can be embedded in the scheduler 108. In one implementation, the co-ex manager 110 may store a schedule of access time slots to the antenna 120 by the various endpoints 14, 116, 118 in the scheduler 108. For example, the co-ex manager 110 may store information about how often a user of the device 102 uses Bluetooth endpoint 118 and the amount of the bandwidth of the antenna 120 is necessary for such typical use. Alternatively, the co-ex manager 110 may store information about how long a typical user-session is when the user uses the cellular modem 114 to communicate via the antenna 120. Using this information, the co-ex manager 110 may prepare a scheduler program for use of the antenna 120 by the various endpoints 114, 116, 118 based on such predetermined conditions.

Furthermore, in one implementation, the co-ex manager 110 may also infer about potential needs of the endpoints 114, 116, 118 for the antenna and generate commands to the scheduler 108. For example, if the WiFi endpoint 116 has not had access to the antenna 120 for a pre-determined time, the co-ex manager 110 may generate a command to the scheduler 108 to provide the WiFi endpoint 116 access to the antenna 120. Furthermore, the co-ex manager 110 may also receive other information about the device 102 such as the location of the device and generate one or more instructions based on such location information. For example, if the co-ex manager 110 also determines that the device 102 is at a home location where the user typically uses only WiFi, it may request the scheduler 108 to limit access by the Bluetooth endpoint 118 and the cellular modem 114 to the antenna 120. In other words, the co-ex manager 110 may give the WiFi endpoint 116 higher priority than the Bluetooth endpoint 118 and the cellular endpoint 114 while the device 102 is at the home location. Similarly, if the co-ex manager 110 determines that the user of the device 102 uses Bluetooth to listen to music at certain locations, such as a gym, upon determination that the user is at a geographic location indicating a gym, it may request the scheduler 108 to limit access by the WiFi endpoint 116 and the cellular modem 114 to the antenna 120 120 (e.g., prioritize the Bluetooth endpoint 118).

In one implementation, the co-ex manager 110 may also communicate directly with the endpoints bypassing the scheduler 114, 116, 118 to determine which endpoint is to have access to the antenna 120 and then controls a switch 112 to connect a selected endpoint to the antenna 112 and send a command to the switch 112 to enable connection between a particular endpoint and the antenna 120. The switch 112 may be a physical switch or it may be a switch implemented using software or firmware. The endpoints 114, 116, 118 may also communicate with the co-ex manager 110 by sending a resource request for using the antenna 120. A resource request from an endpoint to the co-ex manager 110 may also include an amount of time for which the endpoint needs access to the antenna 120 and a priority attached to such a resource request. For example, the cellular model 114 may send a resource request to the co-ex manager 114 for having access to the antenna 120 for 100 ms starting at certain scheduler unit time away from a scheduler frame and indicate that the resource request has a high priority. Priority levels may indicate the level of impact on the wireless endpoint that are associated with the request. In one implementation, the priority levels are represented by a co-ex manager data structure that can embody a priority level and priority impact on the respective wireless endpoint.

The co-ex manager 110 may generate various resource requests and send them to the endpoints 114, 116, 118. For example, the co-ex manager 110 may generate such requests in response to a resource request from an endpoint. As an example, if the WiFi endpoint 116 is currently using the antenna 120, the co-ex manager 110 may send a resource request to the WiFi endpoint 116 with a time for relinquishing use of the antenna 120. Furthermore, such resource request from the co-ex manager 110 to the WiFi endpoint 116 may also include a priority level that informs the WiFi endpoint 116 as to what is the urgency for the WiFi endpoint 116 complying to this request.

Upon receiving the resource request from the co-ex manager 110 with the attached time for relinquishing use of the antenna 120 and the priority, the WiFi endpoint 116 may determine which tasks to complete when it still has access to the antenna 120 and how soon to send an acknowledgement (ACK) back to the co-ex manager 110. If an ACK is received from an endpoint, the co-ex manager 110 generates a program schedule including a series of events at a granularity of the lowest granularity required by the endpoints 114, 116, 118, and stores the program schedule in the scheduler 108. The scheduler 108 operates the switch 112 to provide control of the antenna 120 to a desired endpoint based on such program schedule generated by the co-ex manager.

For example, if the WiFi endpoint 116 has received a resource request from the co-ex manager 110 with 5 ms as the time for relinquishing the antenna 120 with a low priority, the WiFi endpoint 116 may determine that given its current task using the antenna 120, it cannot relinquish control of the antenna 120 in 5 ms and therefore send a negative acknowledgement (NACK) to the co-ex manager 110. The WiFi endpoint 116 may send a NACK request with one or more parameters that provide additional information to the co-ex manager 110. For example, the WiFi endpoint 116 may send a NACK with a specified time that is needs use of the antenna 120. The co-ex manager 110 analyzes such additional information from the NACK response and it may resend another resource request to the WiFi endpoint 116 with modified time for relinquishing the resource, a modified priority level, or a force request.

Additionally, if the WiFi endpoint 116 sends another NACK to the co-ex manager 110, the co-ex manager 110 may add a force parameter to the subsequent resource request sent to the WiFi endpoint 116 to inform it that it is being forced to relinquish control of the antenna 120 after, say 100 micro-seconds. Subsequently, the co-ex manager 110 communicates the command to the switch 112 to change the control of the antenna 120 from the WiFi endpoint 116 to another endpoint as necessary.

Alternatively, the co-ex manager 110 may generate the program schedule for the schedule 108 and store the program schedule in the scheduler 108. In an alternative implementation, the co-ex manager 110 may also delegate the task of managing access to the antenna 120 to one of the endpoints 114, 116, 118. For example, if the co-ex manager 110 determines that the user of the device 102 is at a location, such as home where the user predominantly uses the WiFi endpoint 116, the co-ex manager 110 may delegate control of the switch 112 to the WiFi endpoint 116.

Figure 2:
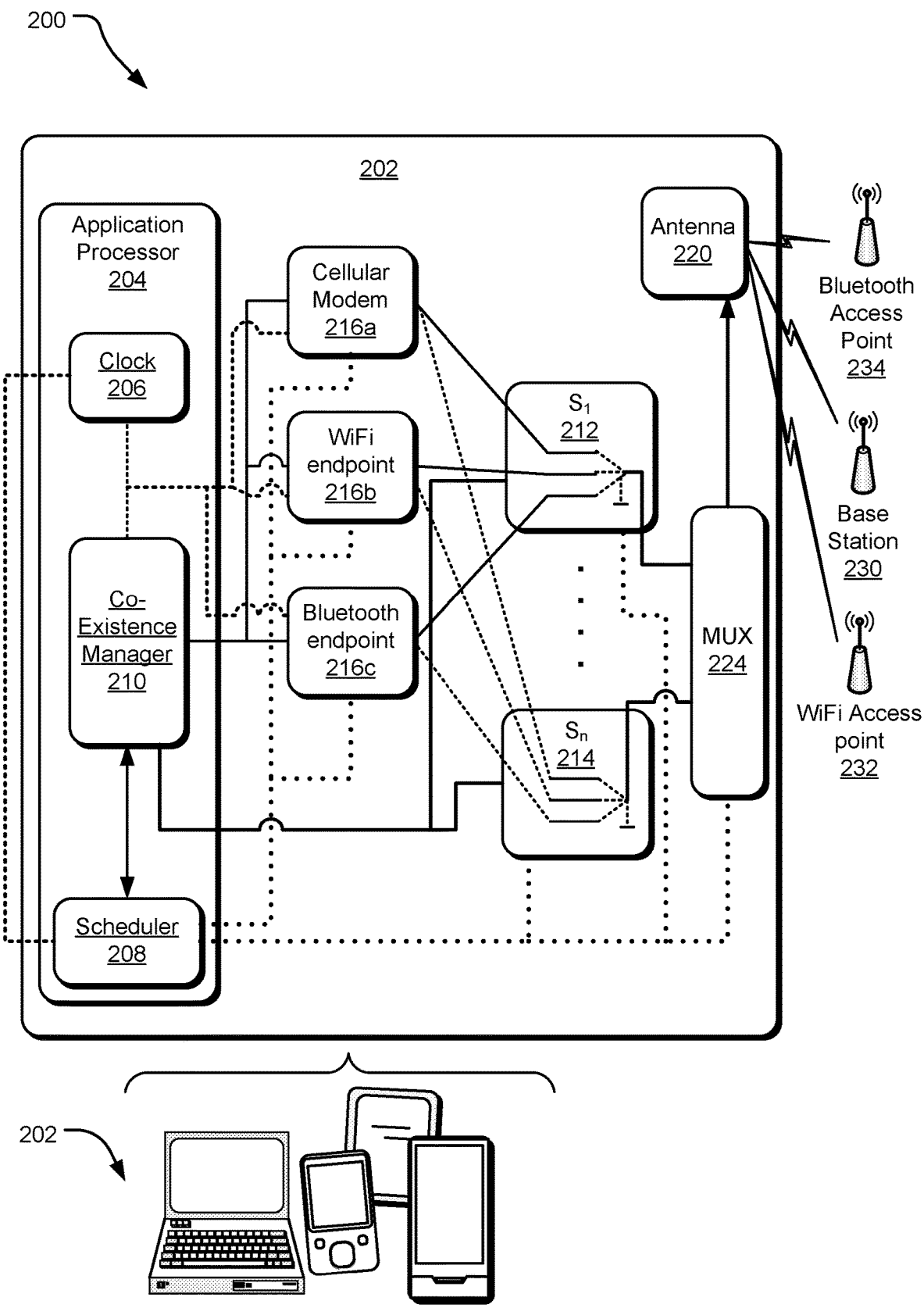
FIG. 2 is an illustration of an alternative example block diagram of a system for sharing an antenna across multiple endpoints according to implementations disclosed herein.

FIG. 2 illustrates an alternative block diagram 200 of a system for sharing an antenna across multiple endpoints according to implementations disclosed herein. The antenna sharing system 200 may be implemented on a device 202 and may include an application processor 204 including a clock 206, a scheduler 208, and a co-ex manager 210. The device 202 may include a cellular endpoint 216a, a WiFi endpoint 216b, and a Bluetooth endpoint 216c, each of them using an antenna 220. Furthermore, the antenna sharing system 200 includes a plurality if switches $S_1$ 21 ... switch $S_n$ 214. Each of the switches $S_1$ 212 ... $S_n$ 214 may be controlled by the co-ex manager 210 to give access to one or two of the endpoints 216a, 216b, 216c access to the antenna 220. Specifically, access to the antenna 220 is controlled by a multiplexer 224. In some embodiments, the device 202 includes only a subset of the endpoints shown in FIG. 2. In some embodiments, the device 202 includes one or more endpoints other than the endpoints shown in FIG. 2, such as a Zigbee, Z-Wave, Thread, or an NFC endpoint.

Based on one or more resource requests from the endpoints 216a, 216b, 216c or based on a command from the co-ex manager 210, the scheduler 208 may control access by the endpoints 216a, 216b, 216c to the antenna 220 using the switches $S_1$ 212, $S_n$ 214. For example, if the antenna 220 is currently used by the WiFi endpoint 216b and the co-ex manager 210 sends a command to the scheduler 208 to give access to each of the cellular modem 216a and the Bluetooth endpoint 216c, the scheduler 208 may send a resource request to the WiFi endpoint 216b to relinquish control of the antenna 220. Upon receiving an ACK from the WiFi endpoint 216b, the co-ex manager 210 may generate a program schedule to control the switches $S_1$ 212 ... $S_n$ 214 so that both the cellular modem 216a and the Bluetooth endpoint 216c have access to the antenna 220 via the multiplexer 224.

In turn, the antenna 220 may communicate using one or more of a base station 230, a Bluetooth access point 234, and a WiFi access point 232. While the implementation disclosed in FIG. 2 illustrates facilitating use of antenna 220 by two endpoints, in an alternative implementation, the use of the antenna 220 among multiple endpoints may be facilitated by using the multiplexer 224 and a requisite number of switches, such as the switches $S_1$ 212, ... $S_n$ 214. For example, with three such switches $S_1$ 212, ... $S_n$ 214 and a multiplexer, the use of the antenna 220 by three endpoints may be facilitated.

Figure 3:
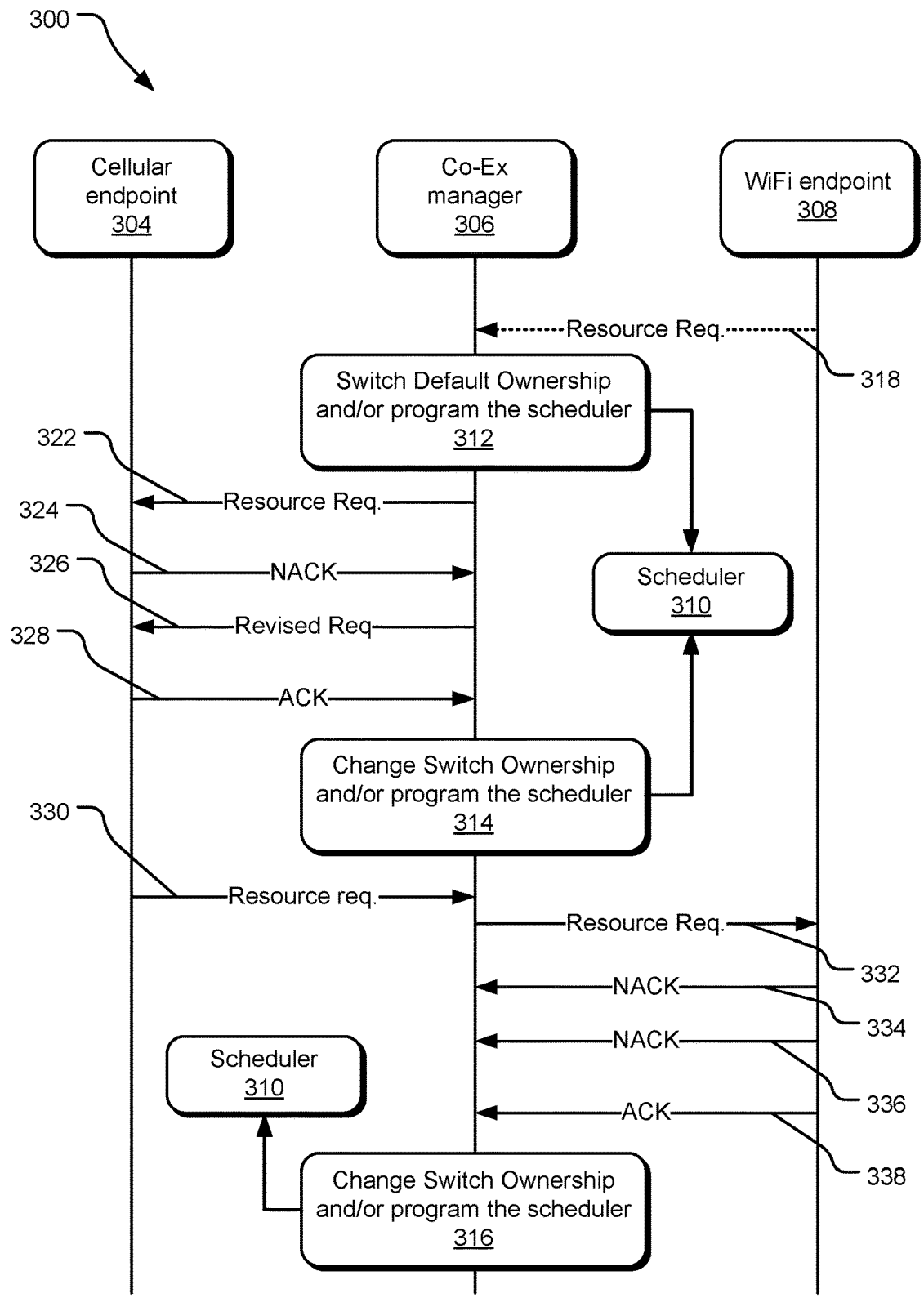
FIG. 3 illustrates example state diagram for sharing an antenna across multiple endpoints according to implementations disclosed herein.

FIG. 3 illustrates example state diagram 300 for sharing an antenna across multiple endpoints according to implementations disclosed herein. As illustrated in FIG. 3, a co-ex manager 306 manages the use of an antenna resource among a cellular modem endpoint 304 and a WiFi endpoint 308. A resource request 318 may be generated by the WiFi endpoint 308 and communicated to the co-ex manager 308. At 312 the co-ex manager 206 may determine to switch default ownership of the antenna from one endpoint to another endpoint. For example, this may be in response to the request 318 to the co-ex manager 306 or based on information that the co-ex manager 306 has. The co-ex manager 308 may determine and end-point that currently uses the antenna to be the cellular endpoint 304.

At 322, the co-ex manager 306 sends a resource request to the cellular endpoint 304 with a time before which it needs to relinquish the control of the antenna. Furthermore, the resource request at 322 may also include a priority level relative to other resource requests. For example, the priority level may be indicated by a value that indicates the level to be one of high, medium, or low. In alternative implementations, additional priority levels may also be provided. The cellular endpoint 304 is configured so as to interpret the resource request from the co-ex manager 306 and take one or more decisions about its use of the antenna resource.

In one implementation, the cellular endpoint 304 may determine that given the priority level and its current needs for antenna, it is not going to relinquish control of the antenna within the relinquish time requested by the co-ex manager 306. Subsequently, at 324, the cellular endpoint 204 may send a NACK to the co-ex manager 306. In one implementation, the NACK at 324 may also include additional information from the cellular endpoint 304, such as the time it needs to complete a task, etc. The co-ex manager 306 reviews the NACK received from the cellular endpoint 304 and information therein and at 326, the co-ex manager 306 may send a revised resource request to the cellular endpoint 304. In one implementation, the revised resource request 326 may have revised relinquish time needed based on the information received as part of the NACK 324. Alternatively, the revised resource request 326 may also include a HIGH_FORCE parameter that instructs that cellular endpoint 304 to relinquish the control of the antenna after an alternative relinquish time period. An acknowledgement (ACK) may be received from the cellular endpoint at 328.

Once the ACK 328 is received, at 314 the co-ex manager 306 may change switch ownership to a desired endpoint, which may be an endpoint other than the cellular endpoint 304, such as the WiFi endpoint 308. Alternately, at 314, the co-ex manager 306 may program the scheduler with a series of events that are to be triggered by the scheduler as per the program schedule. In one implementation, the series of events may be triggered along a clock signal with lowest granularity requited by the various endpoints. At 330, the co-ex manager 306 may receive another resource request, this time from the cellular endpoint 304. At 332 the co-ex manager 306 may send a resource request to the WiFi endpoint 308.

In such an implementation, the co-ex manager 306 may be configured so that is awaits a predetermined time for an ACK from the endpoint before sending a new resource request. Furthermore, the endpoints, such as the WiFi endpoint 308 may be configured to generate NACK responses at predetermined time intervals, such as at every 100 microseconds in response to the resource request from the co-ex manager 306. After NACK 334 and 336, at 338 the WiFi endpoint 308 may send an ACK to the co-ex manager 306. Subsequently, at 316, the co-ex manager 306 may change switch ownership of the antenna to a desired endpoint, which may be an endpoint other than the WiFi endpoint 308. Alternatively, at 316, the co-ex manager 306 may generate a program schedule and program the scheduler 310.

Figure 4:
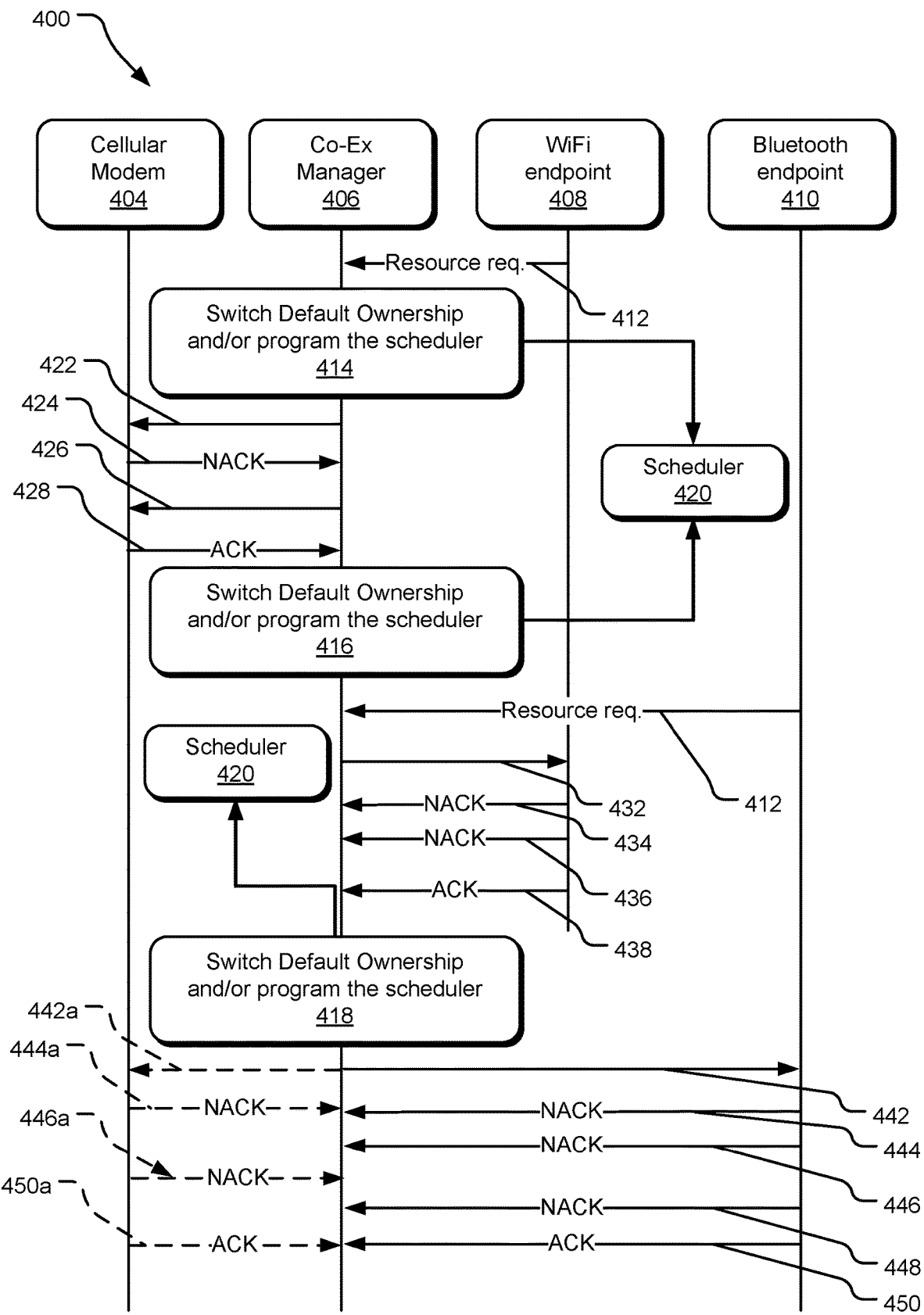
FIG. 4 illustrates alternative example state diagram for sharing an antenna across multiple endpoints according to implementations disclosed herein.

FIG. 4 illustrates alternative example state diagram 400 for sharing an antenna across multiple endpoints according to implementations disclosed herein. FIG. 4 illustrates a co-ex manager 406 arbitrating an antenna resource among a number of endpoints including a cellular modem 404, a WiFi endpoint 408, and a Bluetooth endpoint 410. One or more operations illustrated in FIG. 4 are substantially similar to those disclosed in FIG. 3 but with a different number of endpoints. Specifically, the co-ex manager 406 may receive a resource request from any of the endpoints that currently do not have control of the antenna resource or from a scheduler 420. For example, at 412, the co-ex manager 406 receives a resource request from a WiFi endpoint 412.

In response, at 414, the co-ex manager 406 may determine current endpoint with control of the antenna and to switch the default ownership to another endpoint. Specifically, in the illustrated implementation, the co-ex manager 406 determines that currently, the cellular modem 404 has the control of the antenna resource and it negotiates over a resource request 422, a NACK 424, an alternative resource request 426, and an ACK 428 with the cellular modem 404 to change the ownership of the antenna resource. Subsequently, at 416 the co-ex manager 406 switches the ownership of the antenna to another endpoint. Alternatively, at 414, the co-ex manager 406 may generate a program schedule with a series of events that are initiated to control various switches and programs a scheduler 420 with such program schedule.

At 430, the co-ex manager 406 may receive a resource request from the Bluetooth endpoint 410 and again, over a resource request 432, a NACK 434, another NACK 436, and an ACK 438 with the WiFi endpoint 408 to change the ownership of the antenna resource to another endpoint at 418. Specifically, at 418 the co-ex manager 406 may determine that it is going to provide the use of antenna resource to both the cellular modem 404 and the Bluetooth endpoint 410 via a diplexer, such as the multiplexer 224 disclosed in FIG. 2.

Subsequently, the co-ex manager 406 may receive another resource request from the WiFi endpoint 408 and at 442 and 442a, the co-ex manager 406 may send a resource request to each of the cellular modem 404 and the Bluetooth endpoint 410. For example, the antenna may be a multi-band antenna and the co-ex manager 406 may use one band (e.g., low band) to communicate with the cellular modem 404 and another band (e.g., medium or high band) to communicate with the Bluetooth endpoint 410. After a series of NACKs 444, 446, and 448, the co-ex manager 406 may receive an ACK at 450 from the Bluetooth endpoint 410. Similarly, after receiving two NACKs 444a and 446a, the co-ex manager 406 may receive an ACK at 450a from the cellular modem 404. After receiving ACK from both the Bluetooth endpoint 410 and the cellular modem 404, the co-ex manager 406 may generate another program schedule to program a scheduler, such as the scheduler 420, where the scheduler 420 uses the instructions from such program schedule to generate a series of events controlling one or more switches.

Figure 5:
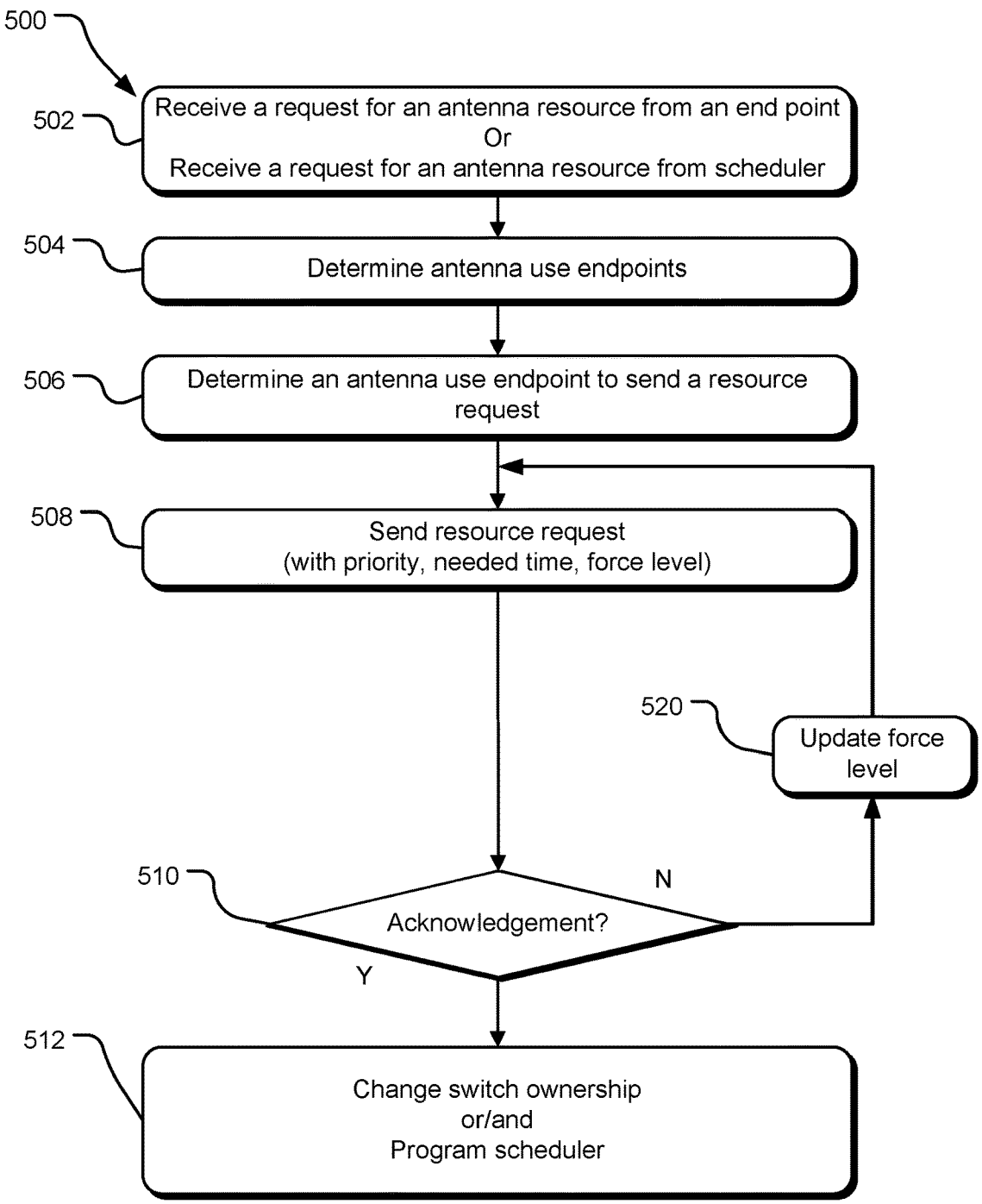
FIG. 5 illustrates example operations for sharing an antenna across multiple endpoints according to implementations disclosed herein.

FIG. 5 illustrates example operations 500 for sharing an antenna across multiple endpoints according to implementations disclosed herein. At operation 502 a co-ex manager may receive a request for an antenna resource from an endpoint. Alternatively, at 502, the co-ex manager may receive a request for an antenna resource from a scheduler. Subsequently, at operation 504, the co-ex manager may determine various endpoints that are using the antenna. At operation 506 the co-ex manager may determine which of these endpoints is currently using the antenna and subsequently, an operation 508 communicates a resource request to that endpoint currently using the antenna. In some embodiments, the antenna is a multi-band antenna and the co-ex manager determines a band to communication to the antenna (e.g., based on current usage/operations of the antenna) then sends the request 508 via the determined band. The resource request may include a time to relinquish the antenna, a priority level, and a force parameter. For example, the operation 508 may send a resource request to a WiFi endpoint with a time to relinquish using the antenna in 20 ms with a medium priority level.

Subsequently, a determining operation 510 determines if an ACK is received from the endpoint using the antenna. If no ACK is received, at operation 520 the co-ex manager may update the force parameter as necessary. Otherwise, if an ACK is received, an operation 512 switches the antenna ownership or generates a program schedule with a series of instructions at a desired clock granularity level and programs a scheduler with such instructions. In some embodiments, programming the scheduler includes identifying a band of the antenna for the subsequent communications. In some embodiments, the scheduler selects a band for scheduled communications (e.g., based on protocol parameters, signal conditions, usage requirements, etc.).

Figure 6:
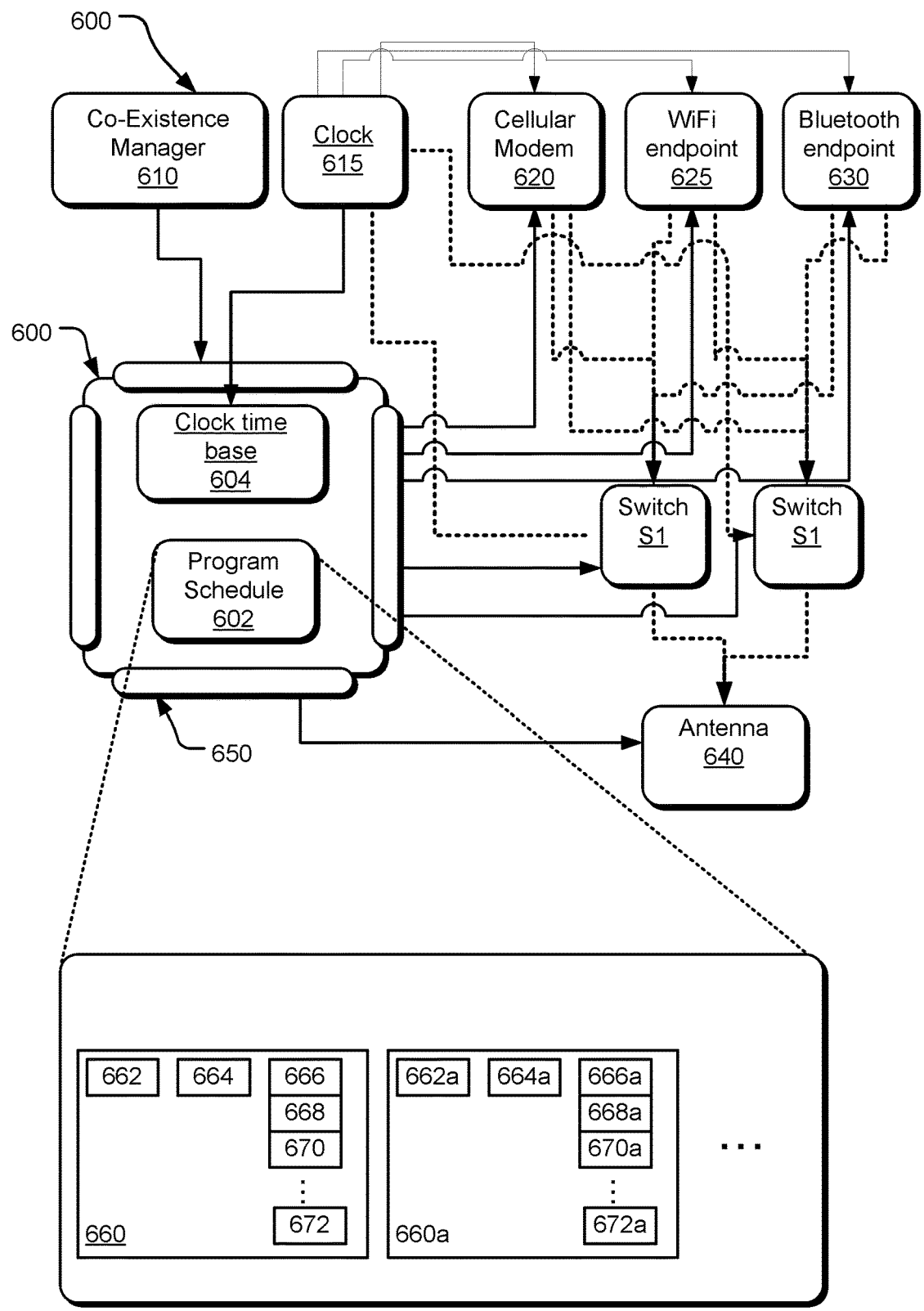
FIG. 6 illustrates an example block diagram of a scheduler that may be used herein with the co-ex manager of the antenna sharing system.

FIG. 6 illustrates a block diagram of a scheduler 600 that may be used herein with the co-ex manager of the antenna sharing system. The scheduler 600 may be implemented as a hardware scheduler, as a software scheduler, or as a firmware scheduler. In one implementation, the scheduler 600 stores a schedule of events that are to be executed as per a program schedule 602 generated by a co-ex manager 610. In some embodiments, the schedule of events includes, for each event, a one or more of: an endpoint associated with the event, a communication protocol for the event, a start time of the event, an expected duration of the event, an expected end time of the event, and transmission parameters for the event (e.g., band selection). The scheduler 600 also receives a clock signal 615 that is also input to switches $S_1 \ldots S_n$ that control access of various endpoints 620, 625, 630 to an antenna 640. Additionally, the scheduler 600 also includes a number of GPIO pins 650 that are used to communicate with the co-ex manager 610, the switches $S_1 \ldots S_n$, the endpoints 620, 625, 630, and the antenna 640.

The scheduler 600 may also include an internal clock time base 604 that is sync'd with the clock 615. The program schedule 602 may include a plurality of events such as events 660, 660a, etc. The event 660 may include a relative time relative time unit 662 based on the clock time base 604 when the event is triggered, an event number 664, and a series of actions 666-672. For example, the action 666 may be to enable an antenna path using a switch, the action 668 may be to toggle a GPIO, an action 670 may be to initiate a loop counter, an action 672 may be to initiate a jump to another event, such as the event 660a.

The example hardware and operating environment of FIG. 7 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 700, the computer 20 also includes a Co-Ex manager 750 providing one or more functions of the antenna sharing operations disclosed herein. The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a co-ex module as illustrated in FIGS. 1-6. In one implementation, one or more instructions to share an antenna across multiple endpoints may be stored in memory of the computer 20, such as the read-only memory (ROM) 24 and random access memory (RAM) 25, etc.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for requesting and managing antenna resource may be stored in system memory 22 and/or storage devices 29 or 31 and processed by the processing unit 21. A CO-Ex module 550 communicatively connected with the processing unit 21 and the memory 22 may enable one or more of the capabilities of the antenna sharing system disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

FIG. 8 illustrates another example system (labeled as a mobile device 800) that may be useful in implementing the described technology. The mobile device 800 includes a processor 802, a memory 804, a display 806 (e.g., a touchscreen display), and other interfaces 808 (e.g., a keyboard). The memory 804 generally includes both volatile memory (e.g., RAM) and non-volatile memory (e.g., flash memory). An operating system 810, such as the Microsoft Windows® Phone operating system, resides in the memory 804 and is executed by the processor 802, although it should be understood that other operating systems may be employed.

One or more application programs 812 are loaded in the memory 804 and executed on the operating system 810 by the processor 802. Examples of applications 812 include without limitation email programs, scheduling programs, personal information managers, Internet browsing programs, multimedia player applications, etc. A notification manager 814 is also loaded in the memory 804 and is executed by the processor 802 to present notifications to the user. For example, when a promotion is triggered and presented to the shopper, the notification manager 814 can cause the mobile device 800 to beep or vibrate (via the vibration device 818) and display the promotion on the display 806.

The mobile device 800 includes a power supply 816, which is powered by one or more batteries or other power sources and which provides power to other components of the mobile device 800. The power supply 816 may also be connected to an external power source that overrides or recharges the built-in batteries or other power sources.

The mobile device 800 includes one or more communication transceivers 830 to provide network connectivity (e.g., mobile phone network, Wifi®, BlueTooth®, etc.). The mobile device 800 also includes various other components, such as a positioning system 820 (e.g., a global positioning satellite transceiver), one or more accelerometers 822, one or more cameras 824, an audio interface 826 (e.g., a microphone, an audio amplifier and speaker and/or audio jack), and additional storage 828. Other configurations may also be employed.

In an example implementation, a mobile operating system, various applications, and other modules and services may be embodied by instructions stored in memory 804 and/or storage devices 828 and processed by the processing unit 802. User preferences, service options, and other data may be stored in memory 804 and/or storage devices 828 as persistent datastores. A Co-Ex manager 850 communicatively connected with the processor 802 and the memory 804 may enable one or more of the capabilities of the antenna sharing system disclosed herein.

The antenna sharing system disclosed herein provides a solution to a technological problem necessitated by the requirement for sharing an antenna resource across multiple endpoints. Specifically, the road antenna sharing system disclosed herein provides an unconventional technical solution to this technological problem by communicating with multiple endpoints to request an antenna resource.

A method disclosed herein includes receiving a request for an antenna resource from one of a plurality of wireless endpoints, determining an endpoint of the plurality of wireless endpoints controlling use of the antenna resource at the time of the request, communicating a resource request to the endpoint controlling use of the antenna resource, the resource request comprising a time for relinquishing use of the antenna resource and a priority level for the antenna resource request and in response to receiving an acknowledgement from the endpoint controlling use of the antenna resource, programming a scheduler with one or more scheduled events controlling access to the antenna by the plurality of wireless endpoints, wherein the scheduled events control one or more switches to connect the plurality of wireless endpoints to the antenna.

In one implementation, the one or more scheduled events control access to the antenna by the plurality of wireless endpoints at a clock granularity that satisfies communication by each of the plurality of wireless endpoints. An alternate implementation of the method further includes receiving a negative acknowledgement (NACK) from the endpoint controlling use of the antenna resource and in response to the NACK, send another resource request with an updated time for relinquishing use of the antenna resource and an updated priority level for the antenna resource request. Yet alternatively, the method further includes receiving another negative acknowledgement (NACK) from the endpoint controlling use of the antenna resource and in response to the another NACK, send another resource request with a force parameter.

In one implementation of the method wherein the NACK from the endpoint controlling use of the antenna resource includes additional use parameters and the updated time for relinquishing use of the antenna resource and the updated priority level for the antenna resource request are generated based on the additional use parameters from the endpoint controlling use of the antenna resource. An alternative implementation of the method includes receiving an acknowledgement (ACK) from the endpoint controlling use of the antenna resource and in response to the ACK, switching the antenna resource to a desired endpoint. In one implementation, switching the antenna resource to a desired endpoint further comprising switching the antenna resource to a plurality of endpoints using a multiplexer. Alternatively, the method further includes controlling use of the antenna resource sending another resource request with a force parameter in response to receiving a predetermined number of NACKs from the endpoint. Alternatively, receiving a request for an antenna resource further comprising receiving the request for the antenna resource from an endpoint that is currently not controlling the antenna resource.

An apparatus disclosed herein includes an antenna, a plurality of endpoints using the antenna, and a co-existence manager configured to share the antenna among the plurality of wireless endpoints by communicating a resource request to one or more of the plurality of endpoints with at least one of a time for antenna resource use and a priority level for the antenna resource use request and in response to receiving an acknowledgement from the endpoint controlling use of the antenna resource, programming a scheduler with one or more scheduled events controlling access to the antenna by the plurality of wireless endpoints, wherein the scheduled events control one or more switches to connect the plurality of wireless endpoints to the antenna. In one implementation, the plurality of wireless endpoints includes one or more of a WiFi endpoint, a cellular modem, and a Bluetooth or similar endpoint. In another implementation, the one or more scheduled events control access to the antenna by the plurality of wireless endpoints at a clock granularity that satisfies communication by each of the plurality of wireless endpoints.

In one implementation, the co-existence manager is further configured to receive a negative acknowledgement (NACK) from the endpoint and in response to the NACK, send another resource request with an updated time for relinquishing use of the antenna resource and an updated priority level for the antenna resource request. Alternatively, the co-existence manager is further configured to receive a negative acknowledgement (NACK) from the endpoint and in response to the NACK, send another resource request with a force parameter. Yet alternatively, the co-existence manager is further configured to receive a predetermined number of negative acknowledgement (NACK) from the endpoint before sending another resource request with a force parameter.

A resource sharing system in a device includes a resource configured to be controlled by or more switches among a plurality of endpoints, a co-ex manager configured to arbitrate use of the resource among the plurality of endpoints by receiving a request for the resource, determining an endpoint controlling use of the resource at the time of the request, communicating a resource request to the endpoint controlling use of the resource, the resource request comprising a time for relinquishing use of the resource and a priority level for the resource request, and in response to receiving an acknowledgement from the endpoint controlling use of the resource, programming a scheduler with one or more scheduled events controlling access to the resource by the plurality of endpoints, wherein the scheduled events control one or more switches to connect the plurality of endpoints to the resource.

In one implementation, the one or more scheduled events control access to the antenna by the plurality of wireless endpoints at a clock granularity that satisfies communication by each of the plurality of wireless endpoints. Alternatively, the resource is an antenna and the plurality of endpoints includes one or more of a WiFi endpoint, a cellular modem, and a Bluetooth endpoint. Yet alternatively, the co-ex manager is further configured to send an updated resource request to the endpoint controlling the use of the resource in response to receiving a NACK from the endpoint controlling the use of the resource, the updated resource request including an updated time for relinquishing use of the resource and an updated priority level for the resource request. In another implementation, the co-ex manager is further configured to send an updated resource request to the endpoint controlling the use of the resource in response to receiving a NACK from the endpoint controlling the use of the resource, the updated resource request including a force parameter.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
   receiving a request for an antenna resource from one of a plurality of wireless endpoints;
   determining an endpoint of the plurality of wireless endpoints controlling use of the antenna resource at the time of the request;
   communicating a resource request to the endpoint controlling use of the antenna resource, the resource request comprising a time for relinquishing use of the antenna resource and a priority level for the antenna resource request; and
   in response to receiving an acknowledgement from the endpoint controlling use of the antenna resource, programming a scheduler with one or more scheduled events controlling access to the antenna by the plurality of wireless endpoints, wherein the scheduled events control one or more switches to connect the plurality of wireless endpoints to the antenna.

2. The method of claim 1, wherein the one or more scheduled events control access to the antenna by the plurality of wireless endpoints at a clock granularity that satisfies communication by each of the plurality of wireless endpoints.

3. The method of claim 2, further comprising:
   receiving a negative acknowledgement (NACK) from the endpoint controlling use of the antenna resource; and
   in response to the NACK, send another resource request with an updated time for relinquishing use of the antenna resource and an updated priority level for the antenna resource request.

4. The method of claim 3, further comprising:
   receiving another negative acknowledgement (NACK) from the endpoint controlling use of the antenna resource; and
   in response to the another NACK, send another resource request with a force parameter.

5. The method of claim 3, wherein the NACK from the endpoint controlling use of the antenna resource includes additional use parameters and the updated time for relinquishing use of the antenna resource and the updated priority level for the antenna resource request are generated based on the additional use parameters from the endpoint controlling use of the antenna resource.

6. The method of claim 3, further comprising:
   receiving an acknowledgement (ACK) from the endpoint controlling use of the antenna resource; and
   in response to the ACK, switching the antenna resource to a desired endpoint.

7. The method of claim 6, wherein switching the antenna resource to a desired endpoint further comprising switching the antenna resource to a plurality of endpoints using a multiplexer.

8. The method of claim 3, further comprising:
in response to receiving a predetermined number of NACKs from the endpoint, controlling use of the antenna resource sending another resource request with a force parameter.

9. The method of claim 1, wherein receiving a request for an antenna resource further comprising receiving the request for the antenna resource from an endpoint that is currently not controlling the antenna resource.

10. An apparatus comprising:
an antenna;
a plurality of endpoints using the antenna; and
a co-existence manager configured to share the antenna among the plurality of wireless endpoints by communicating a resource request to one or more of the plurality of endpoints with at least one of a time for antenna resource use and a priority level for the antenna resource use request and in response to receiving an acknowledgement from the endpoint controlling use of the antenna resource, programming a scheduler with one or more scheduled events controlling access to the antenna by the plurality of wireless endpoints, wherein the scheduled events control one or more switches to connect the plurality of wireless endpoints to the antenna.

11. The apparatus of claim 10, wherein the plurality of wireless endpoints includes one or more of a WiFi endpoint, a cellular modem, and a Bluetooth or similar endpoint.

12. The apparatus of claim 10, wherein the one or more scheduled events control access to the antenna by the plurality of wireless endpoints at a clock granularity that satisfies communication by each of the plurality of wireless endpoints.

13. The apparatus of claim 10, wherein the co-existence manager is further configured to receive a negative acknowledgement (NACK) from the endpoint and in response to the NACK, send another resource request with an updated time for relinquishing use of the antenna resource and an updated priority level for the antenna resource request.

14. The apparatus of claim 10, wherein the co-existence manager is further configured to receive a negative acknowledgement (NACK) from the endpoint and in response to the NACK, send another resource request with a force parameter.

15. The apparatus of claim 10, wherein the co-existence manager is further configured to receive a predetermined number of negative acknowledgement (NACK) from the endpoint before sending another resource request with a force parameter.

16. A resource sharing system in a device, comprising:
a resource configured to be controlled by or more switches among a plurality of endpoints;
a co-ex manager configured to arbitrate use of the resource among the plurality of endpoints by:
receiving a request for the resource;
determining an endpoint controlling use of the resource at the time of the request;
communicating a resource request to the endpoint controlling use of the resource, the resource request comprising a time for relinquishing use of the resource and a priority level for the resource request; and
in response to receiving an acknowledgement from the endpoint controlling use of the resource, programming a scheduler with one or more scheduled events controlling access to the resource by the plurality of endpoints, wherein the scheduled events control one or more switches to connect the plurality of endpoints to the resource.

17. The resource sharing system of claim 16, wherein the one or more scheduled events control access to the antenna by the plurality of wireless endpoints at a clock granularity that satisfies communication by each of the plurality of wireless endpoints.

18. The resource sharing system of claim 16, wherein the resource is an antenna and the plurality of endpoints includes one or more of a WiFi endpoint, a cellular modem, and a Bluetooth endpoint.

19. The resource sharing system of claim 16, wherein the co-ex manager is further configured to send an updated resource request to the endpoint controlling the use of the resource in response to receiving a NACK from the endpoint controlling the use of the resource, the updated resource request including an updated time for relinquishing use of the resource and an updated priority level for the resource request.

20. The resource sharing system of claim 16, wherein the co-ex manager is further configured to send an updated resource request to the endpoint controlling the use of the resource in response to receiving a NACK from the endpoint controlling the use of the resource, the updated resource request including a force parameter.

* * * * *